United States Patent [19]

Ashbee et al.

[11] Patent Number: 4,675,761
[45] Date of Patent: Jun. 23, 1987

[54] MAGNETIC HEAD POSITIONING APPARATUS AND METHOD

[75] Inventors: William H. Ashbee, Boulder; Richard S. Kilen, Longmont; Alan J. Kirton; Larry E. Rittenhouse, both of Boulder; James A. Valent, Longmont, all of Colo.

[73] Assignee: International Business Machines Corporation, Armonk, N.Y.

[21] Appl. No.: 835,617

[22] Filed: Mar. 3, 1986

[51] Int. Cl.$^4$ .............................................. G11B 5/55
[52] U.S. Cl. ..................................................... 360/78
[58] Field of Search .................................. 360/75, 78

[56] References Cited

U.S. PATENT DOCUMENTS 4,477,755 10/1984 Rickert ................................ 360/78
4,581,664 4/1986 Sordello et al. ..................... 360/78
4,600,868 7/1986 Bryant .................................. 360/78

Primary Examiner—George G. Stellar
Attorney, Agent, or Firm—Robert E. Harris

[57] ABSTRACT

An apparatus and method are disclosed for positioning magnetic heads relative to the recording tracks of a recording medium such as a floppy disk having circular, concentric recording tracks formed thereon. The magnetic heads are mounted on a head carriage, and the head carriage is moved, in response to received command pulses, so that the heads are moved linearly, by step increments, along a radius of the floppy disk. The heads are thereby moved across the spaced tracks on the disk, with each incremental movement of the heads being a distance less than the distance between the tracks, and being, for example, one-half or one-fourth of the total distance between tracks. Acoustic noise due to head movement is minimized by moving the heads by increments less than the distance between the tracks, with such movement avoiding exciting the resonances of the head moving apparatus. The magnetic heads are initially moved at a rate known to avoid exciting the resonance and, during such initial movement, the rate of received command pulses is determined. If the received command pulse rate is within a predetermined range, and is a rate that will not excite resonance, continued movement of the head is at the rate of the received command pulses.

20 Claims, 18 Drawing Figures

MAGNETIC HEAD POSITIONING APPARATUS AND METHOD

FIELD OF THE INVENTION

This invention relates to a positioning apparatus and method, and, more particularly, relates to an apparatus and method for positioning the magnetic heads of a recording device relative to recording tracks.

BACKGROUND OF THE INVENTION

Positioning apparatus is well known for use in causing controlled movement of various devices, and such apparatus is now commonly used, for example, for causing controlled movement of the magnetic heads of recording devices.

Floppy disk magnetic recording devices commonly include a head carriage having upper and lower magnetic heads mounted thereon which cooperate with recording tracks on the upper and lower magnetic recording surfaces of a removable floppy disk. Such disks now in common use are 5¼ inch and 3½ inch diameter disks having circular, concentric tracks thereon with now popular track formats being 48 and 96 tracks per radial inch (TPI).

When the disk is in operating position within the recording device, it is known that the head carriage can be moved to cause movement of the head, or heads, along a radius of the rotating disk to thereby locate each head at a desired track so that the device can transduce the information thereat (i.e., either write information onto the disk on the desired track or read information stored thereat).

To effect a desired positioning of the heads, it is also known that command pulses can be provided to initiate the desired head movement, and such movement can be thereafter effected by an electric motor, such as a stepper motor.

It is also known that the number of command pulses received can be utilized to signify the number of tracks across which the magnetic head must be moved in order to position the head at a desired track. Different systems, however, supply command pulses at different rates, and this has sometimes created a problem since many recording devices cannot respond at some command pulse rates and the rate of received command pulses can be such that optimum positioning of the heads is adversely affected.

In addition, acoustic noise arising in connection with movement of magnetic heads has also presented a problem, with such acoustic noise arising from exciting the resonance of the head moving apparatus sometimes causing severe problems, including possible damage to the head carriage mechanism.

SUMMARY OF THE INVENTION

This invention provides an apparatus and method for positioning a magnetic head with acoustic noise arising from such movement being minimized regardless of the rate of received command pulses causing movement of the head.

It is therefore an object of this invention to provide an improved apparatus and method for positioning a magnetic head.

It is another object of this invention to provide an improved apparatus and method for positioning a magnetic head that minimizes acoustic noise.

It is still another object of this invention to provide an improved apparatus and method for positioning a magnetic head that minimizes acoustic noise by controlling the rate of movement of the head.

It is another object of this invention to provide an improved apparatus and method for positioning a magnetic head by causing movement of the head at an incremental rate that avoids exciting the resonances of the apparatus.

It is still another object of this invention to provide an improved apparatus and method for positioning a magnetic head that measures the received command pulse rate and permits movement of the head at the command pulse rate only if this rate is within an acceptable range known to avoid exciting the resonance of the apparatus.

It is yet another object of this invention to provide an improved apparatus and method for positioning a magnetic head that moves the head at a predetermined rate if the command pulses are below a preset minimum or above a preset maximum rate.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
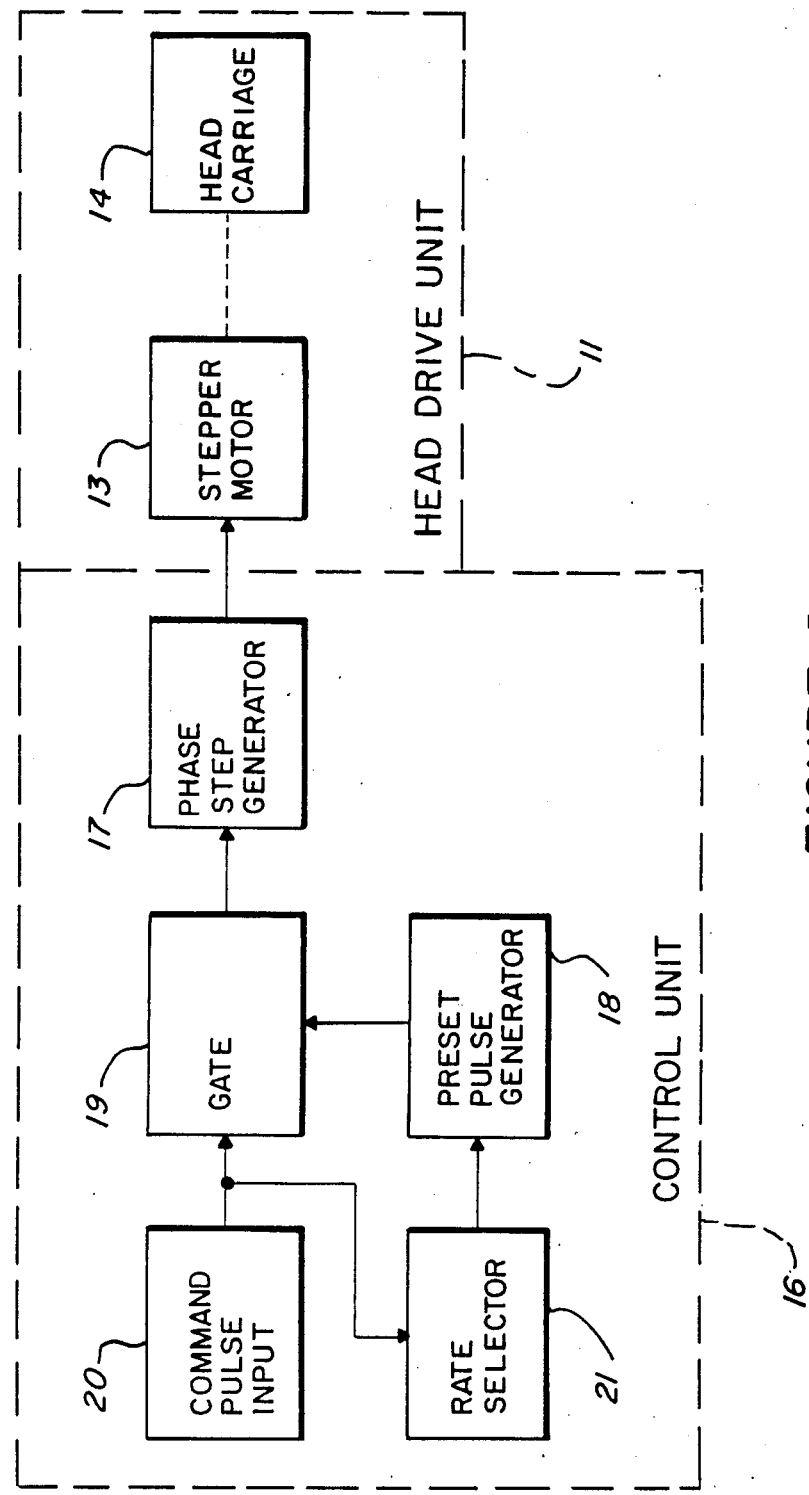
FIG. 1 is a simplified block diagram of the apparatus of this invention.

As indicated in the simplified block diagram of FIG. 1, head drive unit 11 includes a stepper motor 13, which motor controls movement of head carriage 14. Energization of stepper motor 13 is controlled by control unit 16, which unit includes phase step generator 17, with generation of the phase steps to be coupled to stepper motor 13 being controlled by outputs from preset pulse generator 18, coupled through gate 19, and by control pulses (also called step or access pulses) from command pulse input 20, also coupled through gate 19. As indicated, preset pulse generator 18 is controlled by rate selector 21 which also receives the command pulses.

Figure 2:
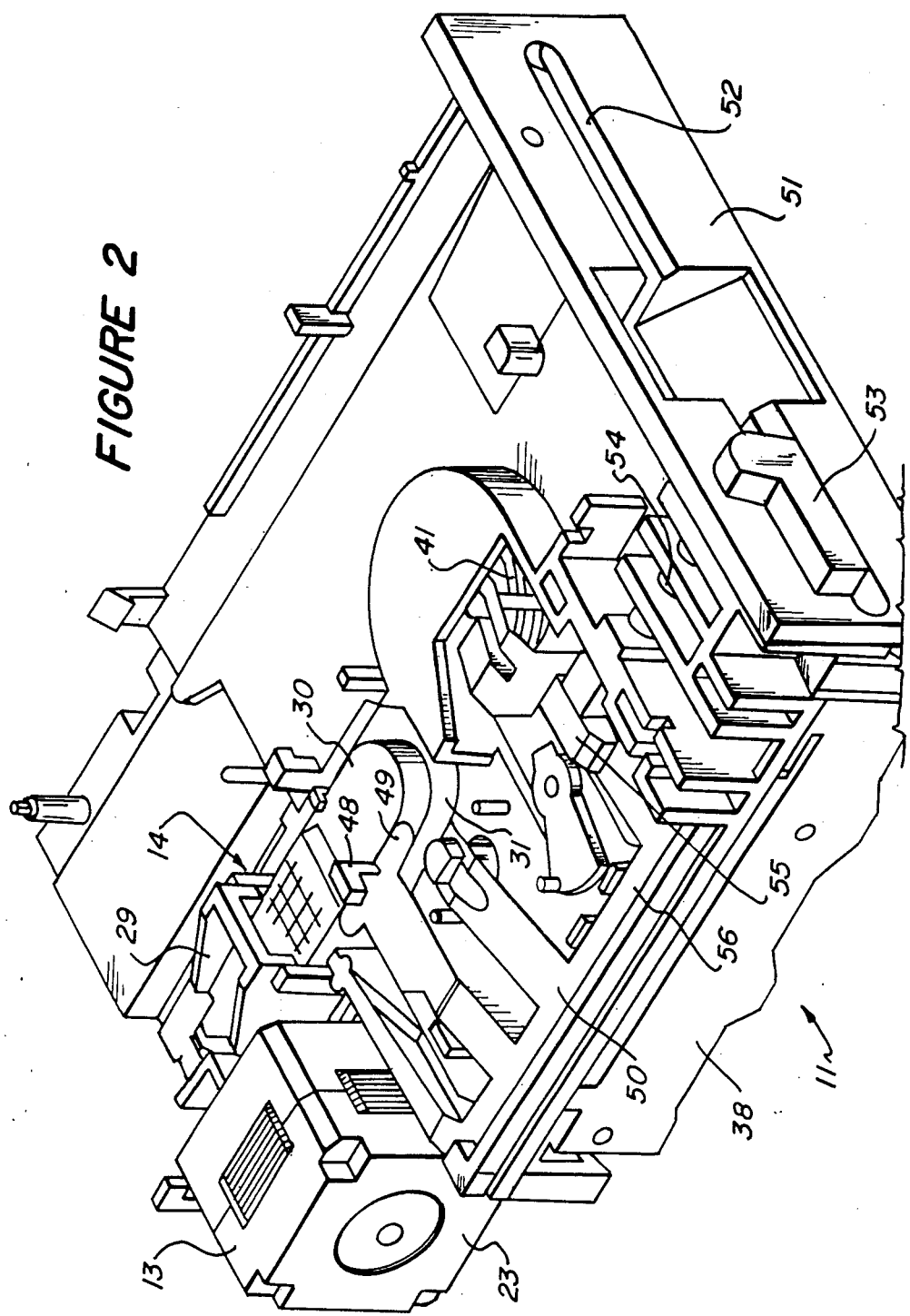
FIG. 2 is a perspective view of a drive unit utilizable as a part of this invention.
Figure 3:
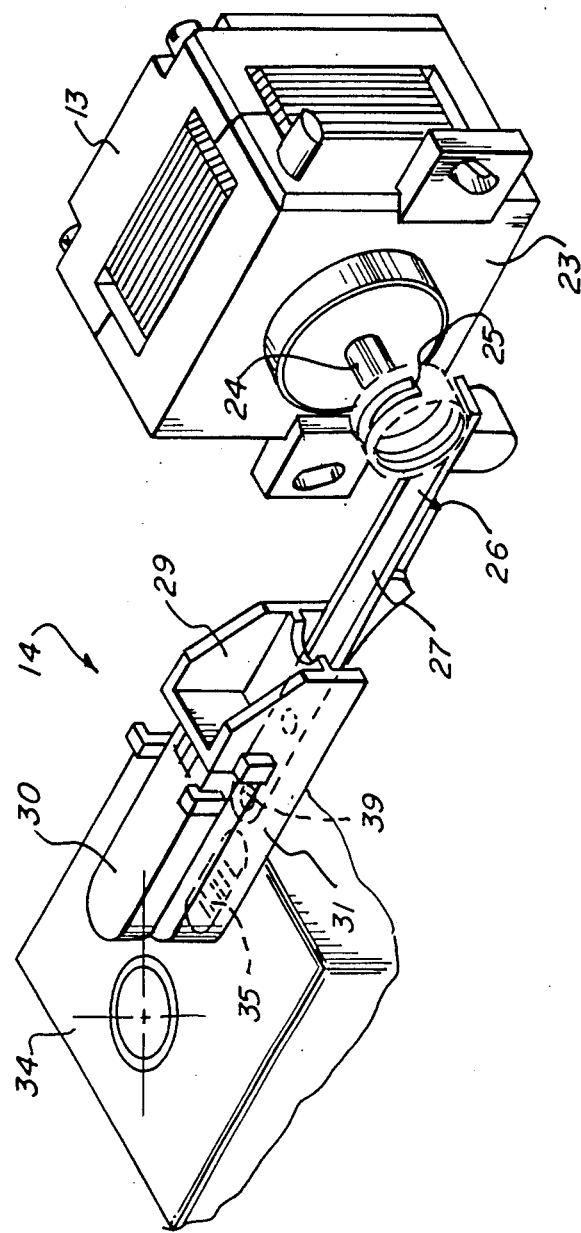
FIG. 3 is a perspective view of the stepper motor and head carriage shown in FIG. 2, and illustrates positioning of the magnetic heads relative to a floppy disk when in operating position.
Figure 4:
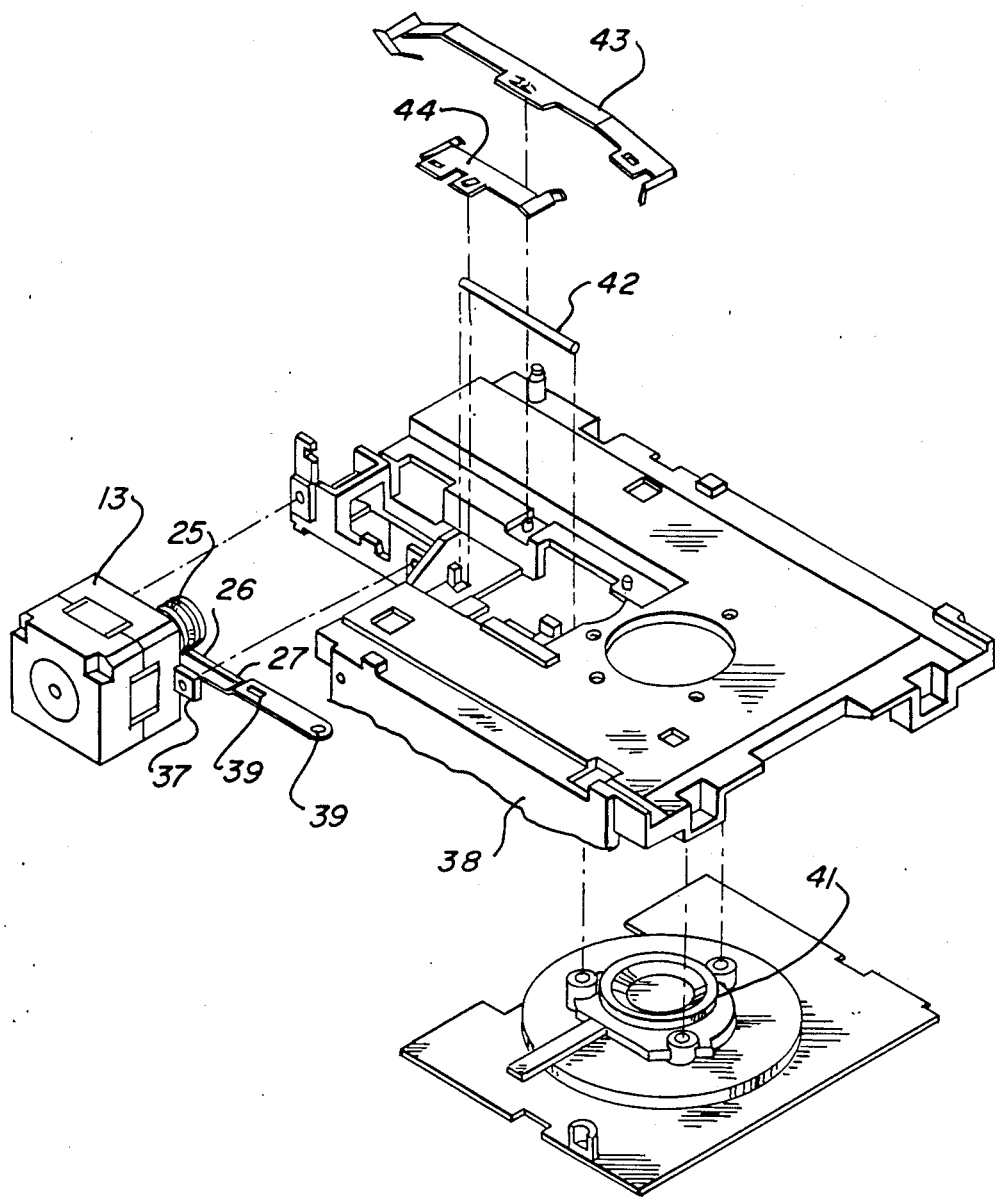
FIG. 4 is an exploded perspective view showing positioning of the stepper motor on the mounting base.
Figure 5:
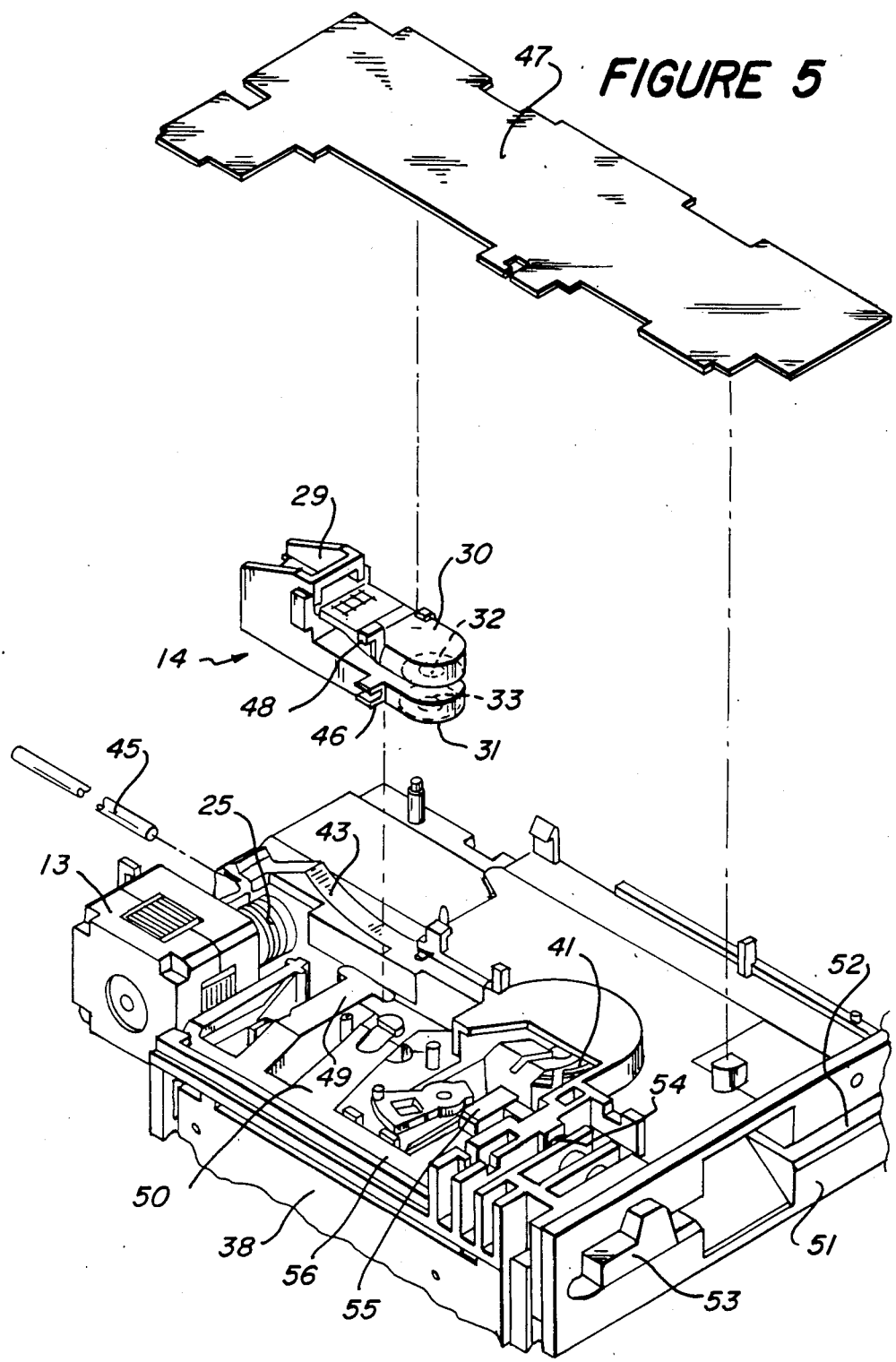
FIG. 5 is an exploded perspective view showing positioning of the carriage head on the mounting base.

Head drive unit 11 is shown in greater detail in FIGS. 2 through 5, with FIG. 2 showing an assembled view of the drive unit, FIG. 3 showing stepper motor 13 and head carriage 14 in greater detail, FIG. 4 showing the assembly of the stepper motor to the base unit, and FIG. 5 showing the assembly of the head carriage to the base unit.

As best shown in FIG. 3, stepper motor 13, encased within housing, or casing, 23, has a rotatable motor shaft 24 extending therefrom. Shaft 24 has band pulley 25 thereon, and pulley 25 is connected with band and tensioner mechanism 26, the free end of which is connected with head carriage 14. As shown, band and tensioner mechanism 26 includes strip, or band, 27 which has a flat portion extending between pulley 25 and head carriage 14 such that strip 27 is moved linearly by rotation of shaft 24 and pulley 25 to move head carriage 14 in reciprocal linear directions.

As indicated in FIGS. 3 and 5, head carriage 14 includes a mounting bracket 29 having a recording head arm 30 pivoted thereon, with arm 30 having magnetic head 32 mounted thereon. Magnetic head 33 is mounted directly to end 31 of carriage 14. Magnetic heads 32 and 33 face one another, are preferably offset with respect to one another, and are spaced a sufficient distance to allow floppy disk 34 to be inserted therebetween, as is indicated in FIG. 3.

The movement of head carriage 14 causes movement of magnetic heads 32 and 33, which heads are positioned above and below the upper and lower recording surfaces of a horizontally positioned floppy disk 34 when the disk is inserted between the upper and lower arms. This movement causes the heads to be moved radially with respect to the disk across tracks 35 on the upper and lower surfaces of the disk (when the tracks on the disk have a concentric, circular configuration on each recording surface of the disk, as is common).

As best shown in FIG. 4, stepper motor 13 is mounted by means of mounting flanges 37 to base, or mounting, unit 38, and strip 27 has apertures 39 at the free end to enable head carriage 14 to be secured thereto. Base unit 38 also has spindle unit 41 mounted thereon so that the spindle rotates floppy disk 34 when in the operating position within the apparatus.

As also indicated in FIG. 4, guide rod 42 and clips 43 and 44, which are a part of the carriage track assembly, also are mounted on base unit 38. Rod 42 is positioned at one side of the carriage track to guide movement of head carriage 14 in the reciprocal linear directions, and clips 43 and 44 hold rods 45 (see FIG. 5) and 42, respectively, in position at the opposite sides of the carriage track.

As best shown in FIG. 5, head carriage 14 is positioned on base unit 38 and rod 45 is inserted through guide bokes (not shown) on the head carriage to control the movement of the head carriage in the opposite linear directions when strip 27 is connected to the head carriage unit. As shown, head carriage 14 also has U-shaped abutment 46 extending from the side of the carriage. After assembly, logic card 47 is positioned over the assembled unit.

As best shown in FIG. 2, head carriage 14 has an upwardly and outwardly extending ear 48, positioned above abutment 46, to receive thereunder T-shaped member 49 of actuating assembly 50 which is utilized in actuating pivot arm 30 relative to a floppy disk within the apparatus.

As indicated in FIGS. 2 and 5, front panel 51 of the apparatus has an aperture 52 of a size to receive floppy disk 34 therethrough when actuating handle 53 has been turned to the open position (as indicated in FIGS. 2 and 5) to receive the disk. Handle 53, when turned to the locked position, causes positioning of the disk within the apparatus since handle 53 is connected with shaft 54 which, in turn, is connected with disk positioning cam 55 (which acts in conjunction with actuator 56 of actuating assembly 50) to position the disk in the operating position within the apparatus so that, upon rotation of the disk, the magnetic heads can transduce information to (or from) the track (or tracks) then aligned with the head (or heads).

In this invention, stepper motor 13 is controlled by control unit 16 so that the stepper motor causes incremental movement of the head carriage to move the magnetic heads by increments between the tracks on the floppy disk with each incremental movement being less than the distance between the tracks. Such incremental movement can require, for example, two or four incremental movements between each track depending upon whether the floppy disk has 96 tracks per radial inch (TPI) or 48 tracks per radial inch (TPI), both of which are now commonly utilized on $5\frac{1}{4}''$ diameter disks.

As indicated in FIG. 1, phase step generator 17 receives command pulses, from command pulse input 20, and pulses from preset pulse generator 18, through gate 19. The rate of received phase pulses through gate 19 is controlled by rate selector 21.

A command to move from one track to another (as, for example, from track N to track N+20) is coupled to the control unit 16 from an external device, usually the computer system or computer-using device with which the positioning apparatus is associated. Under the assumed condition of a desired twenty track positioning change of the magnetic head, the using device issues 20 access, or command pulses, one for each track to be moved.

The floppy disk positioning apparatus of this invention is designed to accommodate access pulses received from a number of using systems of different design even through the access pulses have an initially unknown constant pulse rate. The positioning unit must also provide fast access times (i.e., movement between tracks in a minimum time period), but yet the response to the access pulses must not be allowed to damage the head carriage moving mechanism (as can occur by exciting the natural resonant frequencies of the mechanism).

This invention dynamically adapts movement of the head carriage to the rate at which the access pulses are received, so that the carriage is moved as quickly as possible, dependent upon the rate at which access pulses are received, and yet prevents damage to the mechanism.

This is accomplished in the apparatus of this invention by moving the head between tracks by N half-step energizations of a stepper motor where N can, for example, equal 2 or 4. The command to move the head carriage one track comprises one access (step or command) signal pulse for each track to be moved, and the time T between access pulses is measured, and the motor is stepped at time intervals T/N.

If the time interval T is very short, so that the motor is incapable of executing a step (or half-step) in the time T/N, then the access pulses are buffered, and the N steps are executed at a preset time interval of 1.5 milliseconds (MS). If, on the other hand, the time interval T is very long (over 12 milliseconds), then the N half-steps are also executed at the 1.5 MS interval.

Since the time interval T is initially unknown, the first N half-steps of any command move of the magnetic head are executed at the preset 1.5 MS interval. During this time, the time T is measured, and the following N half-steps are executed at the interval T/N unless the received command pulses are below a minimum rate or above a maximum rate, or if the interval T/N is within a range known to excite the resonant frequencies of the head moving apparatus. If any of the foregoing should occur, then the N half-steps are executed at the preset 1.5 MS interval.

While known motors may be utilized to move the head carriage between tracks, it has been found that a stepper motor that rotates 0.9° for each half-step (i.e., 400 half-steps per revolution) will provide a satisfactory operating arrangement. In this arrangement, if the motor is energized for four half-steps (i.e., a total of 3.6° of rotation) the head will be moved in four increments to the adjacent track for a 48 TPI disk. If, on the other hand, the motor is energized for two half-steps (i.e., a total of 1.8° of rotation), this will also move the head to the next track for a 96 TPI disk.

Each stepper motor has four stator windings and two of these windings are maintained energized to cause the head to remain positioned at a desired track (single phase energization occurs only during accessing). In order to move the head from a first track to a different second track by clockwise motor rotation, the half-step coil energization sequence of the stators is as follows (assuming coils 1 and 3 are energized at the first track)—coil 3 is de-energized, coil 4 is energized, coil 1 is de-energized, and coil 2 is energized. Access in this manner reduces the acceleration experienced by the head actuator, which results in less vibration of the actuator and this generates less acoustic noise (approximately 5 db less acoustic noise than for normal access).

A command to move the head from a first track to a different second track comprises a single step-command pulse for each track to be moved (i.e., 5 pulses indicate a five track move). Each pulse produces two stator coil energization sequences (i.e., half-steps) or, in the alternative, 4 half-steps depending upon whether a 96 TPI or a 48 TPI format is being utilized.

In this invention, the step command pulses are utilized in an adaptive manner to order to prevent a stator coil energization sequence which will set up a resonant mechanical oscillation of the stepper motor and its load.

So long as the step command pulses do not exceed a spacing of 12 milliseconds, the time interval between pulses is divided by 4 or 2 (depending upon the TPI utilized), and the motor stator coil half-step energization occurs at equally spaced time intervals which are equal to the result of this division. If this spacing exceeds 12 milliseconds, then the preset 1.5 millisecond spacing is utilized for the coil half-step energization sequence.

For example, if the system is sending multi-track command pulses at a time interval spacing of 8 microseconds for each pulse (i.e., a command to move one track), then the 4 halfsteps which are necessary to allow movement in a 48 TPI device move occurs at 2 millisecond intervals.

Initially, the first step-command pulses are responded to by utilizing the preset 1.5 MS interval. After two consecutive step-command pulses have been received, however, the logic network measures the time intervals between these pulses, and the above-mentioned division occurs (unless the spacing exceeds 12 milliseconds). If the step-command pulses are too closely spaced, such that the motor cannot respond to this high pulse rate, the pulses are buffered, and then supplied to the motor at a rate at which the motor can respond.

FIG. 7 illustrates the foregoing for accessing a 48 TPI disk. FIG. 7A illustrates typical command pulses having a time spacing therebetween of 6 milliseconds (167 Hz). FIG. 7B illustrates a step pulse response having 1.5 millisecond spacing (667 Hz), which is also the preset step pulse generation rate utilized as a known pulse spacing to prevent exciting the resonances of the head moving apparatus.

Figure 7A:
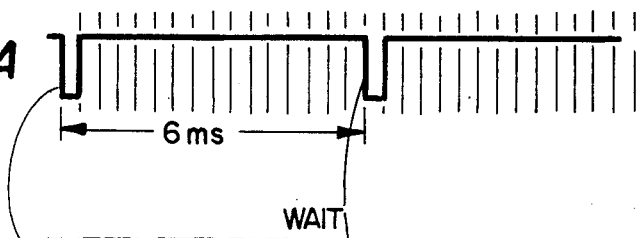
FIGS. 7A through 7H form a series of typical waveforms illustrating operation according to this invention.
Figure 7B:
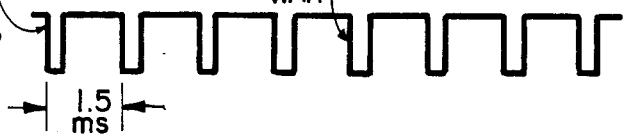
Figure 7C:
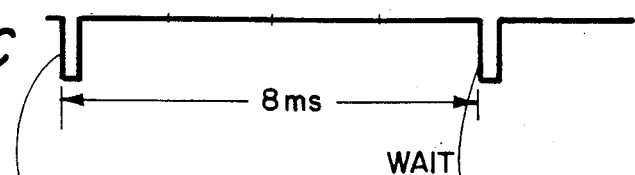
Figure 7D:
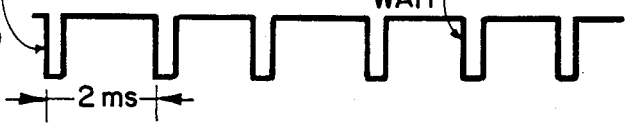

FIG. 7C illustrates typically a command pulse spacing of 8 milliseconds, with FIG. 7D illustrating a step pulse response having a 2 millisecond spacing between the phase pulses (which pulses can be utilized by the device without exciting the resonance of the head moving apparatus).

Figure 7E:
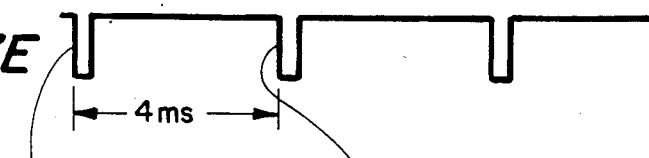
Figure 7F:
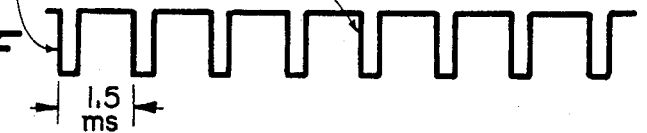

FIG. 7E illustrates a command pulse rate that is too short to allow the head moving mechanism to respond (a pulse spacing of 4 milliseconds is specifically illustrated), and FIG. 7F illustrates that, under this condition, the preset spacing of 1.5 milliseconds is utilized, with the command pulses being stored and utilized as rapidly as possible.

Figure 7G:
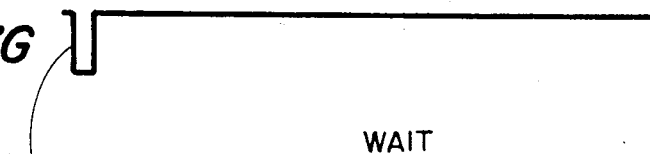
Figure 7H:
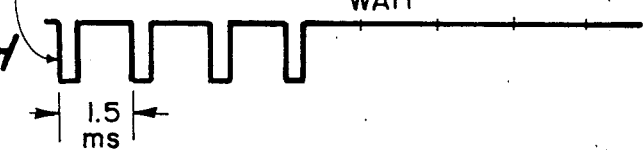

FIG. 7G illustrates a very long command pulse of over 12 milliseconds, under which condition, the preset 1.5 millisecond spacing of the phase pulses is utilized as illustrated in FIG. 7H.

Figure 7I:
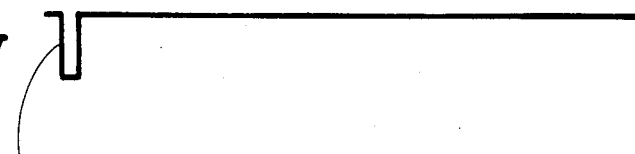
FIGS. 7I and 7J form a series of typical waveforms that may result in an unacceptable resonance in the absence of the present invention.
Figure 7J:
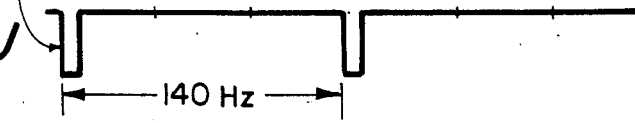

FIG. 7I illustrates command pulses occurring at a rate such that the resulting phase pulses (as shown in FIG. 7J), would cause the resonance of the head moving mechanism to be excited (the resonant frequencies of head moving mechanisms have been found, for example, to be about 140 Hz). Under this condition, the preset phase pulses, such as shown in FIG. 7J would be precluded from occurring utilizing this invention, and instead the preset 1.5 millisecond spacing, as shown in FIG. 7B would be utilized to avoid exciting the resonances.

Figure 6:
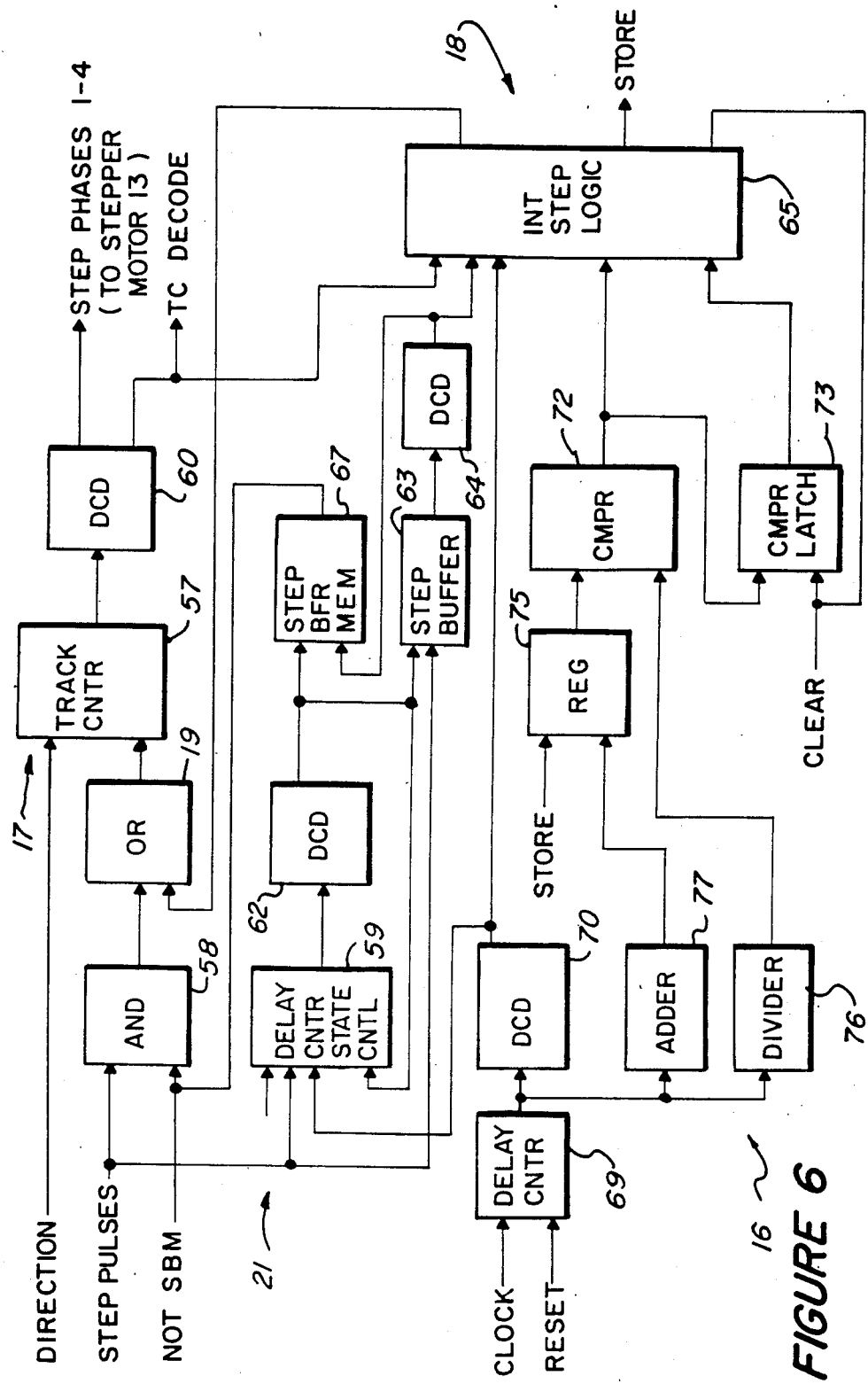
FIG. 6 is an expanded block diagram of the control unit shown in FIG. 1.

The expanded block diagram of FIG. 6 describes control unit 16 in greater detail. As shown, step, or command, pulses are conveyed both to 8 bit track counter 57 of phase step generator 17 (through AND gate 58 and OR gate 19) and to delay counter state control 59 (of rate selector 21). Track counter 57 also receives a direction input for incrementing or decrementing the counter, and the output from track counter 57 is coupled through decoder 60 to stepper motor 13 to step the motor by energization of the phases thereof.

The output from delay counter state control 59 is coupled through decoder 62, step buffer 63, and decoder 64 to internal step pulse logic 65. In addition, the output from decoder 62 is coupled as an input to delay counter state control 59 and to step buffer memory (SBM) 67, which memory receives a second input from decoder 64 and provides a second input to AND gate 58 (along with a Not SBM input).

Internal step logic 65 also receives an input from 11 bit delay counter 69 through decoder 70 (which input is also coupled to delay counter state control 59), receives a third input from comparator 72, a fourth input from comparator latch 73, and a fifth input from decoder 60. Comparator 72 receives inputs from register 75 and divider 76, with register 75 being connected to receive the output from adder 77 and a store input (from internal step logic 65) and with divider 76 and adder 77 being connected to receive the output from delay counter 69. Comparator latch 73 receives the output from comparator 72 and a clear input (which is also coupled to internal step logic 65).

To accomplish adaptive control, a 6 state machine is utilized as the main control for controlling operation of delay counter 69 and by which internal steps to the stepper motor are caused to be generated. Basically, a loop having two modes of operation, non-buffered and buffered, is established to accomplish this desired end.

Non-buffered operation takes place whenever the step pulse rate is at the normal rate or slower. Buffered operation means one or more step pulses must be stored temporarily while internal steps are generated.

Figure 8:
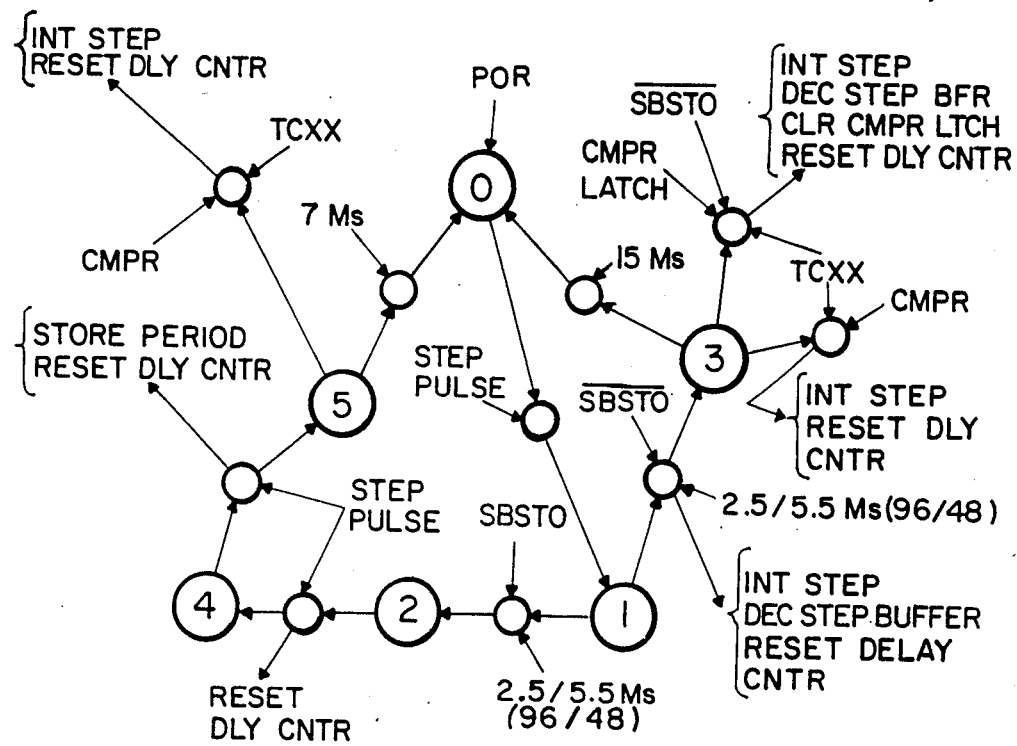
FIG. 8 is a state diagram illustrating operation of the delay counter state control shown in FIG. 6.
Figure 9:
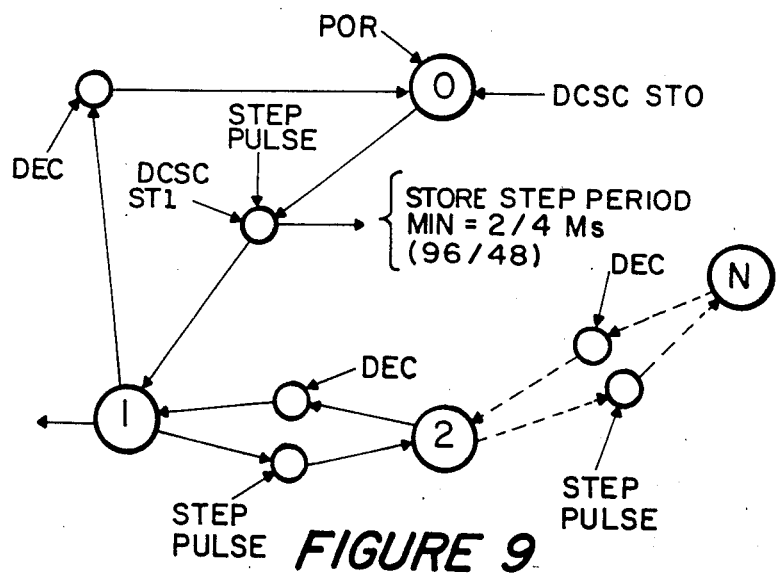
FIG. 9 is a state diagram illustrating operation of the step buffer shown in FIG. 6.

Operation of the loop is illustrated in FIGS. 8 and 9 (with operation for both a 96 TPI disk and a 48 TPI disk being indicated). As illustrated, starting from state 0, the first step pulse (command) received advances the loop to state 1. While in state 1, one internal step pulse is generated for use in conjunction with a 96 TPI disk and three internal step pulses are generated for use with a 48 TPI disk.

As delay counter 69 continues to run, step buffer 63 samples for the presence of a second step pulse received prior to 2.5 milliseconds for 96 TPI (5.5 milliseconds for 48 TPI). If this should occur, the step buffer is advanced to state 1 (as illustrated in the step buffer state diagram of FIG. 9). If a step pulse is not received, however, then the state loop is advanced to state 2.

From state 2, the next step pulse received causes the loop to advance to state 4. While in state 4, the internal step pulses are generated in the same manner as in state 1. At this point, when a third step pulse is received, then the period between step pulses 2 and 3 is stored, and the loop is advanced to state 5. In state 5, internal steps are generated using the adaptive period stored. The loop continues to remain in state 5 until such time that 7 milliseconds is counted from the last internal step (7 milliseconds is used since this exceeds the maximum internal adapted step period of 6 milliseconds).

In the case of buffered mode operation, once the step buffer is advanced to state 1, the state control loop is prevented from sequencing from state 1 to state 2. At this point, when 2.5 milliseconds is reached for 96 TPI (5.5 for 48 TPI) then an internal step is generated, the step buffer is decremented, the delay counter is reset, and the loop is advanced to state 3. In state 3, internal steps are generated in two ways. The initial step of a string is generated when the step buffer is not 0, the track counter is not on a half step boundary, and the adaptive period latch is set.

Since the adaptive step period is slightly less than one-fourth of an actual 48 TPI period, the internal steps will tend to catch up with step pulses over a period of many steps when in the buffered mode. The compare is therefore latched so that if the step buffer should be incremented from 0 to 1 following the compare, the operation will continue properly. An alternate way to accomplish this is when the track counter is on half track boundaries and the adaptive period compare is equal.

The loop remains in state 3 until the step buffer is empty and all internal steps have been generated. Following the point where the last internal step was generated, when the delay counter reaches 15 milliseconds (to account for head settle time), then the loop is returned to state 0.

To assure that the tracks are properly indexed for movement between specific tracks, recalibration must occur. While some devices have electromechanical track 0 sensors for accomplishing this purpose, other such devices do not have such sensors, and recalibration requires that enough access pulses be sent to the drive in order to assure that the head is properly positioned over track 0 when this condition is desired. This requires a restraining pin (not shown) to keep the head actuator from accessing beyond track 0. When the actuator repeatedly strikes this pin, however, an undesirable audible noise results.

To reduce the acoustic noise associated with head recalibration, the power used in recalibration access is preferably lowered to produce about half the power to the access stepper, which results in approximately a 10 db reduction in acoustic noise during head recalibration, as compared to a full speed, full power recalibration. For best operation, it has been found that the drive control should not start the recalibration until the heads are loaded, which can be accomplished by waiting for spindle motor on after power-on-reset and then sensing the first index pulse.

To accurately locate the head carriage, it is also preferred that the head carriage always approach the desired track from one direction to thereby null out the position hysteresis in the carriage drive or positioning system. When accessing a track from the direction opposite the needed final approach direction, the last step pulse must be detected, and one step is added to the access, after which one step back is taken to the desired track (i.e., creating a back hitch).

While the last step can be detected by using a time delay longer than the longest expected step pulse period and, when no pulse is detected in this time period after the last step pulse, sensing that the last step pulse did arrive and the last head carriage step was therefore complete, this wastes time since the track access step period varies depending upon the adapter utilized.

However, if the period of the track access step pulses generated by the adapter is measured with a microcomputer, this measured time period (plus a small time increment to cover clock jitter) can then be utilized to measure each succeeding step pulse period. If no pulse occurs in this time period following a step pulse, this demonstrates that the last step pulse has been sent, and the step sequence to generate a back hitch can be then generated (if needed).

The track access time is minimized when the step pulse rate is constant since the step pulse period is known. The track access step period can be measured during any track access greater than one step, and for an initial one step move, a time delay can be used to detect the last step. A constant step rate at a selected frequency is required, as are adapters to generate step pulses at a constant rate. If a step pulse arrives during the back hitch sequence, the microcomputer can provide the appropriate control sequence.

As can be appreciated from the foregoing, this invention provides an improved apparatus and method for controlling the positioning of a magnetic head in a manner so as to minimize noise due to movement of the head during positioning between tracks.

What is claimed is:

1. An apparatus for positioning a magnetic head relative to the recording tracks on a recording medium, said apparatus comprising:

carriage means having said magnetic head mounted thereon, said carriage means being mvoable in at least one predetermined direction relative to said recording medium such that movement of said carriage means in said one predetermined direction causes said head to be aligned with different ones of said tracks on said recording medium;

carriage actuating means connected with said carriage means for moving said carriage means in said one predetermined direction; and control means connected with said carriage actuating means, said control means being adapted to receive commands indicative of a desired change of positioning of said head relative to the tracks on said recording medium and, responsive thereto, causing said carriage actuating means to move said carriage means by increments with each said increment causing movement of said head a distance less than the distance between said tracks along said predetermined direction of movement of said head, said control means causing initial movement of said head to be at a predetermined rate that is independent of the rate that commands are received by said control means, with continued movement, after said initial movement, being at a rate dependent upon the rate of received commands when the rate of said received commands is within a predetermined range known to be incapable of exciting the resonances of the apparatus whereby acoustic noise due to movement of said head is minimized.

2. The apparatus of claim 1 wherein said recording medium is a disk, wherein said tracks are concentrically formed on said disk with each of said formed tracks being radially spaced from each adjacent track, wherein said carriage actuating means causes movement of said carriage means in a manner such that said head is moved along a predetermined radius of said disk, and wherein said control means causes said movement of said head by increments each of which is less than the distance between said tracks on said disk.

3. The apparatus of claim 1 wherein said carriage actuating means is a stepper motor, wherein said commands are command pulses, wherein said control means includes selector means for receiving said command pulses and energizing said stepper motor in response thereto, and wherein said stepper motor causes movement of said head by increments.

4. The apparatus of claim 3 wherein the number of received command pulses is indicative of the desired track on said recording medium to be aligned with said head, and wherein said control means includes means to cause movement of said head by increments equal to a multiple of each track to be traversed by said head during movement to said desired track.

5. The apparatus of claim 4 wherein said movement by increments is equal to one of twice and four times that of each said track to be traversed by said head.

6. An apparatus for positioning a magnetic head relative to the tracks on a recording disk, said apparatus comprising:

carriage means having said magnetic head mounted thereon so that said head is constrained to movement with said carriage means in at least one predetermined direction of movement of said carriage means, with movement of said carriage means in said one predetermined direction causing said head to be moved along a predetermined radius of said disk to thereby traverse the tracks thereon whereby the track on said disk brought into alignment with said head is dependent upon the amount of movement of said head along the radius of said disk;

stepper motor means connected with said carriage means to cause movement of said head along said radius of said disk; and control means connected wtih said stepper motor, said control means including selector means receiving command pulses indicative of a desired change of positioning of said head relative to the tracks on said disk and, responsive thereto, causing said stepper motor to move said head by increments with a multiple of said incremental moves being required for each said track to be traversed by said head in moving to a desired track, said control means causing initial movement of said carriage means to be at a predetermined rate known to avoid exciting the resonance of said apparatus with said rate being also independent of the rate that command pulses are received by said control means, and with continued movement, after said initial movement, being at a rate dependent upon the rate of received command pulses when said received command pulse rate is within a predetermined range known to avoid exciting the resonance of the apparatus whereby acoustic noise due to movement of said head is minimized.

7. The apparatus of claim 6 wherein said movement of said head along said radius of said disk is half-steps, and wherein said stepper motor causes movement of said carriage means by increments equal to one of twice and four times that of each said track to be traversed by said head.

8. The apparatus of claim 6 wherein said selector means includes means for determining if said rate of command pulses exceeds the ability of said stepper motor to move said carriage means and for determining if said rate of command pulses is less than a predetermined rate and, if so, then causing said incremental movement of said head to be at said predetermined rate.

9. The apparatus of claim 6 wherein said control means includes internal step generating means for generating step phase signals capable of causing said stepper motor to be moved by said increments, and state determining means receiving said command pulses and being connected with said internal step generating means for controlling operation thereof.

10. The apparatus of claim 9 wherein said control means includes buffer means connected wtih said state determining means for controlling operation of said stepper motor when said received command pulses exceed a predetermined rate.

11. A method for positioning a magnetic head relative to the tracks on a recording medium, said method comprising:

providing command pulses indicative of a desired change of alignment of said magnetic head relative to the tracks on said recording medium;

responsive to said received pulses, causing initial movement of said head at a predetermined rate that is known to avoid exciting the resonance of the apparatus causing movement of the head with such rate being also independent of the rate of said command pulses, and with said movement of said head being by increments less than the distance between said tracks along the path of movement of said head; and determining the rate of received command pulses and, if within an acceptable predetermined range that avoids exciting the resonance of the apparatus causing movement of the head, causing said continued movement of said head at the rate of said received command pulses until said head is aligned with said desired track.

12. The method of claim 11 wherein said method includes initially moving said head by increments having a time interval of about 1.5 milliseconds.

13. The method of claim 11 wherein said method includes causing continued incremental movement of said head at said initial rate if said received command pulses have a time interval that exceeds about 12 milliseconds.

14. The method of claim 11 wherein said method includes reducing acoustic noise due to recalibration of said apparatus to assure proper alignment of said head with respect to the desired track.

15. The method of claim 11 wherein said method includes determining the direction of movement of said magnetic head, detecting the last of said command pulses, and causing a back hitch at said predetermined rate if said movement of said magnetic head is other than in a predetermined direction to thereby assure proper alignment of said head with respect to the desired track.

16. The method of claim 11 wherein said method includes providing a stepper motor and causing said stepper motor to move said head by said increments.

17. The method of claim 11 wherein said movement of said head is caused to be returned to said predetermined rate utilized for initial movement of said head whenever said command pulses are determined to be at any one of a rate that causes exciting of the resonance of the apparatus causing incremental head movement, a rate that exceeds the capability of movement of the head, and at a rate that is slower than a predetermined rate.

18. In a method of energizing a stepper motor in order to move a magnetic head from one track to another, wherein N (N>1) half-steps of said motor are necessary to cause the head to move a distance of one track, wherein a command signal initiates head movement, wherein said command signal comprises one command pulse for each track to be moved, and wherein the command pulses defining a multi-track move are at a constant but initially unknown time period T, an improvement comprising:

responding to at least the first command pulse of a multi-track move command by stepping said motor N half-steps per track, at a predefined time period for each step, which predefined time period is known to be incapable of exciting the resonance of the motor and the load connected therewith;

measuring the time period T which occurs between command pulses, and calculating therefrom a time period T/N;

using said calculated period T/N, a lieu of said predefined time period, to provide said N half-steps per track if said period T/N is of a value known to be incapable of exciting said resonance, but continuing to use said predefined time period if said calculated time period T/N is of a value known to excite said resonance; and sensing occurrence of command pulses at a period T which is higher than the ability of said motor to move said N half-steps in said period T, and storing any such occurrence of said command pulses for use to produce said N half-steps at said predefined time.

19. The method of claim 18 where N is one of two and four.

20. The method of claim 18 wherein said measured time period occurs later than the period between said first and second command pulses to minimize error.

* * * * *